(12) United States Patent
Coe et al.

(10) Patent No.: US 12,665,911 B2
(45) Date of Patent: Jun. 23, 2026

(54) CYBERSECURITY EVENT HANDLING AND ENRICHMENT SYSTEM

(71) Applicant: NuHarbor Security, Inc., Colchester, VT (US)

(72) Inventors: Shawn A. Coe, Bow, NH (US); Luca T. Demian, Bow, NH (US); Ryan J. Berg, San Antonio, TX (US); Justin G. Fimlaid, Stowe, VT (US); John J. Danahy, Kennebunk, ME (US)

(73) Assignee: NuHarbor Security, Inc., Colchester, VT (US)

( * ) Notice: Subject to any disclaimer, the term of this patent is extended or adjusted under 35 U.S.C. 154(b) by 87 days.

(21) Appl. No.: 18/808,662

(22) Filed: Aug. 19, 2024

(65) Prior Publication Data

US 2026/0075062 A1 Mar. 12, 2026

Related U.S. Application Data

(60) Provisional application No. 63/539,214, filed on Sep. 19, 2023.

(51) Int. Cl.
*H04L 9/40* (2022.01)
*H04L 43/04* (2022.01)

(52) U.S. Cl.
CPC .......... *H04L 63/1416* (2013.01); *H04L 43/04* (2013.01)

(58) Field of Classification Search
CPC ........................... H04L 63/1416; H04L 43/04
See application file for complete search history.

(56) References Cited

U.S. PATENT DOCUMENTS

| | | | |
|---|---|---|---|
| 2021/0218764 A1* | 7/2021 | Lowney .............. | H04L 63/1441 |
| 2023/0315884 A1* | 10/2023 | Pham .................... | G06F 21/552 |
| | | | 726/27 |
| 2024/0039929 A1* | 2/2024 | Pisha .................. | H04L 63/1416 |
| 2024/0039936 A1* | 2/2024 | Pisha .................. | H04L 63/1425 |

* cited by examiner

*Primary Examiner* — Baotran N To
(74) *Attorney, Agent, or Firm* — Davis, Malm & D'Agostine, P.C; Richard L. Sampson

(57) ABSTRACT

A Cybersecurity Event Handling Processor (CEHP) and method for processing security alerts includes: a File System containing a Universal Target Schema (UTS) of target language representations (UTS JSONs); a Normalizer running Feature Extraction and Word Embeddings algorithms; a Tree Converter; and a Transformer running linguistic and structural matching algorithms. The CEHP: (a) captures threat events in one or more native formats generated by cybersecurity tools; (b) runs Feature Extraction and Word Embeddings algorithms for tokenization and categorization of the captured events to create normalized events; (c) converts the normalized events into trees and then translates the trees into event representations in JSON (or XML) format (Event JSONs); and (d) runs nearest neighbor and/or linguistic and structural matching algorithms to compare the Event JSONs to the UTS JSONs to generate output JSONs (Translation JSONs) from the UTS corresponding to the captured events.

22 Claims, 17 Drawing Sheets

Alerts such as the ones shown in the previous examples are streamed from the native environment into our Polyglot translation model and subsequently transformed into a common ontology.

Data Flow

Alerts such as the ones shown in the previous examples are streamed from the native environment into our Polyglot translation model and subsequently transformed into a common ontology.

Data Flow

Example 1       14'

```
"event": {
  "event_id": "12345",
  "event_type": "threat_detection",
  "event_timestamp": 1646749633000,
  "event_category": "Access Token Manipulation Detected",
  "event_description": "Access Token Manipulation has
been detected on endpoint.",
  "severity": "High",
  "event_time": "2023-03-10T12:00:00Z",
  "category": "Endpoint Detection and Response",
  "mitre_technique": "Access Token Manipulation (T1134)",
  "host": {
    "hostname": "endpoint1",
    "ip": "192.168.1.100",
    "os": "Windows 10 Pro",
    "user": "JohnDoe" } }
```

Example 2       14"

```
{ "AlertID": "03040506078",
  "AlertName": "Access Token Compromise",
  "AlertDescription": "Indications of Access Token Manipulation activity have been found
on the endpoint.",
  "Severity": "High",
  "AlertTimestamp": "2023-03-10T12:00:00Z",
  "Category": "Endpoint Detection and Response",
  "Technique": "Access Token Manipulation",
  "Hostname": "endpoint1",
  "IP": "192.168.1.100",
  "OS": "Windows 10 Pro",
  "User": "JohnDoe" }
```

Alert Examples

Fig. 2

Example Output

26

```
"event": {
    "event_type": "Endpoint Detection and Response",
    "event_timestamp": "2023-03-10T12:00:00Z",
    "event_category": "Endpoint Detection and Response",
    "event_description": "Indications of Access Token
Manipulation activity have been found on the endpoint.",
    "severity": "High",
    "category": "Endpoint Detection and Response",
    "mitre_technique": "Access Token Manipulation",
    "host": {
        "hostname": "endpoint1",
        "ip": "192.168.1.100",
        "os": "Windows 10 Pro",
        "user": "JohnDoe" } }
```

Translation Output

Fig. 4

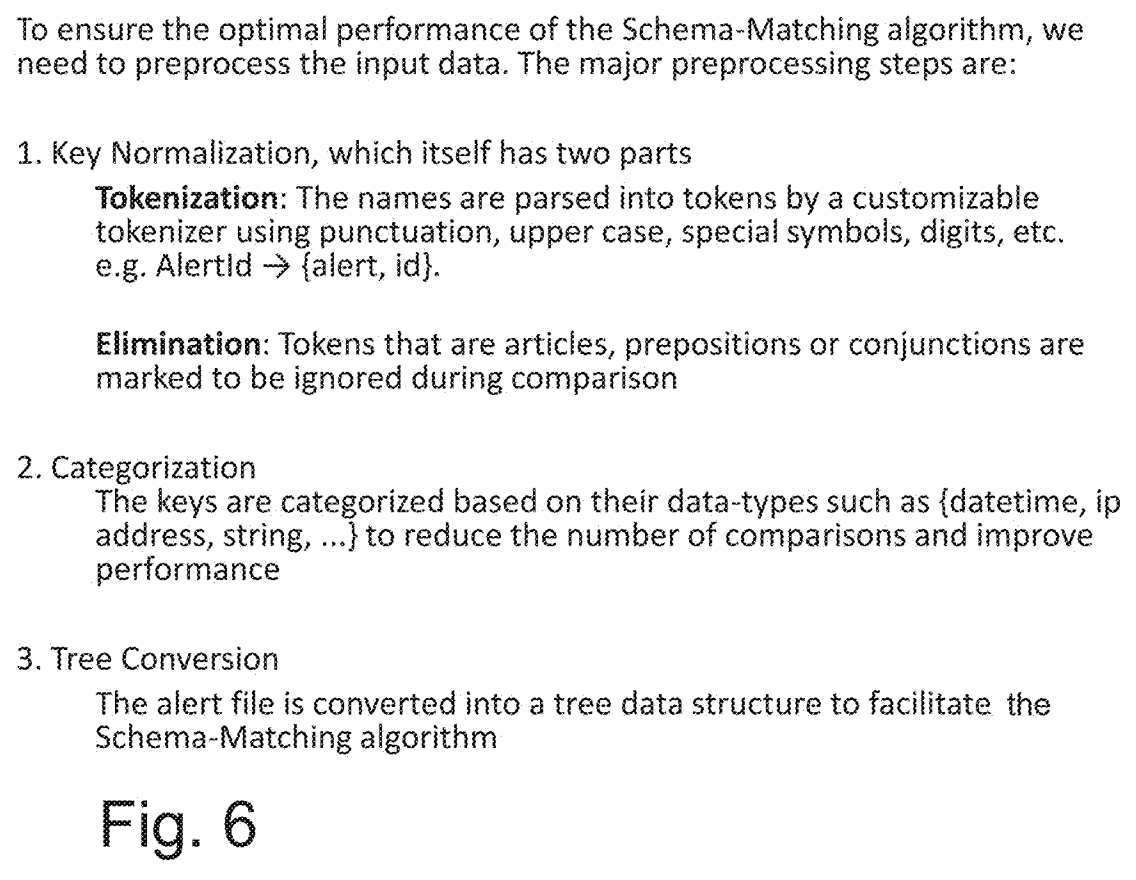

To ensure the optimal performance of the Schema-Matching algorithm, we need to preprocess the input data. The major preprocessing steps are:

1. Key Normalization, which itself has two parts

Tokenization: The names are parsed into tokens by a customizable tokenizer using punctuation, upper case, special symbols, digits, etc. e.g. AlertId → {alert, id}.

Elimination: Tokens that are articles, prepositions or conjunctions are marked to be ignored during comparison 2. Categorization The keys are categorized based on their data-types such as {datetime, ip address, string, ...} to reduce the number of comparisons and improve performance 3. Tree Conversion The alert file is converted into a tree data structure to facilitate the Schema-Matching algorithm

Fig. 6

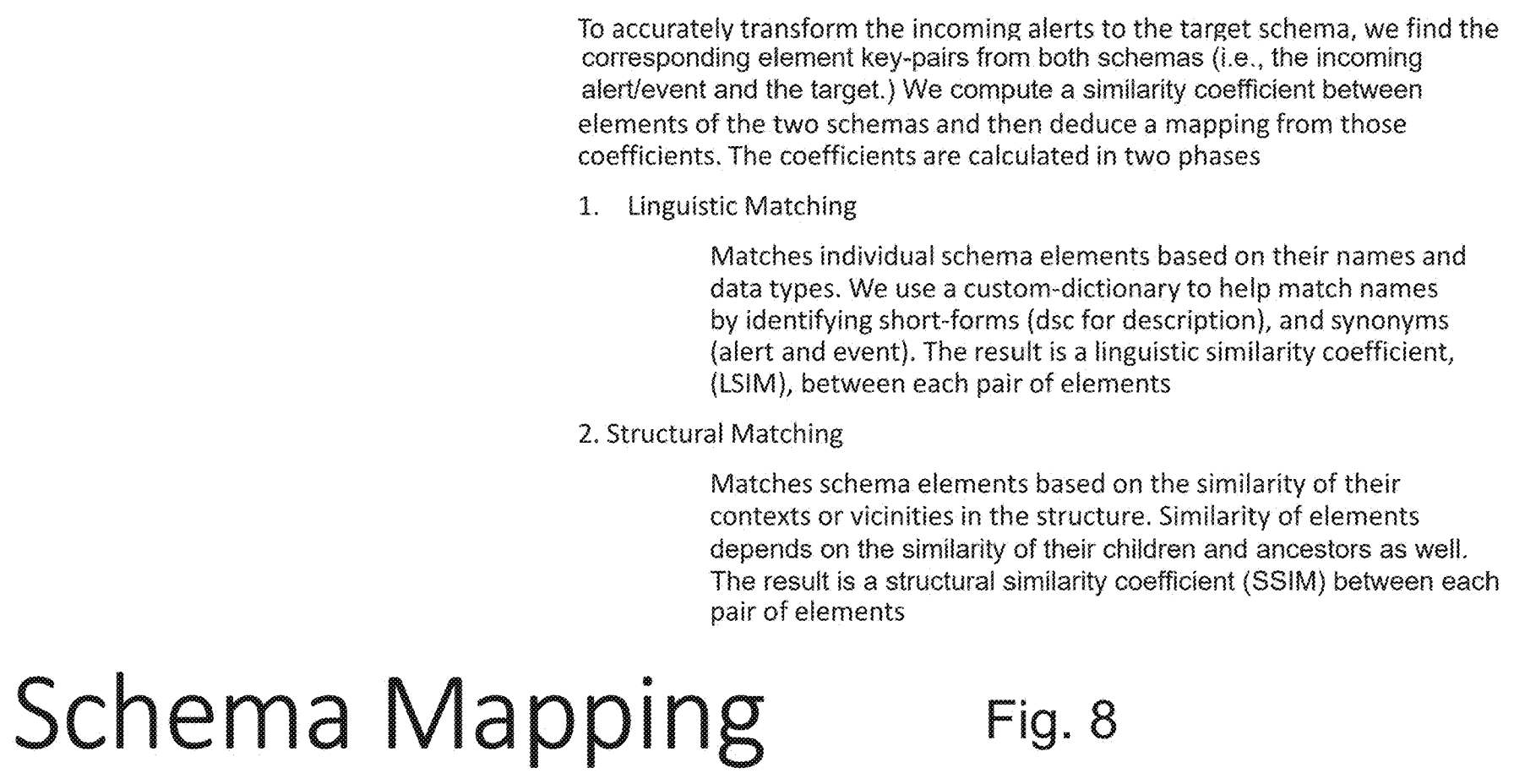

To accurately transform the incoming alerts to the target schema, we find the corresponding element key-pairs from both schemas (i.e., the incoming alert/event and the target.) We compute a similarity coefficient between elements of the two schemas and then deduce a mapping from those coefficients. The coefficients are calculated in two phases 1. Linguistic Matching Matches individual schema elements based on their names and data types. We use a custom-dictionary to help match names by identifying short-forms (dsc for description), and synonyms (alert and event). The result is a linguistic similarity coefficient, (LSIM), between each pair of elements 2. Structural Matching Matches schema elements based on the similarity of their contexts or vicinities in the structure. Similarity of elements depends on the similarity of their children and ancestors as well. The result is a structural similarity coefficient (SSIM) between each pair of elements

Schema Mapping Fig. 8

LINGUISTIC SIMILARITY

Let the tokenized version of an element be denoted by $T_i$.

For example, $T_1 = (\{event\}, \{id\})$ where $t_1 = event$ and $t_2 = id$.

The name similarity of two tokens $T_1$ and $T_2$ is calculated using the formula:

$$ns(T_1, T_2) = \frac{\sum_{t_i \in T_1}\left[\max_{t_j \in T_2} sim(t_i, t_j)\right] + \sum_{t_j \in T_2}\left[\max_{t_i \in T_1} sim(t_i, t_2)\right]}{|T_1| + |T_2|}$$

Then the linguistic similarity becomes:

$$lsim(T_1, T_2) = ns(T_1, T_2) * ns(C_1, C_2)$$

Where $ns(C_1, C_2)$ is the name similarity between the datatype of the two elements.

Note: The $sim(C_1, C_2)$ is implemented using the NLTK Wu-Palmer WordNet similarities.

Linguistic Similarity    Fig. 9

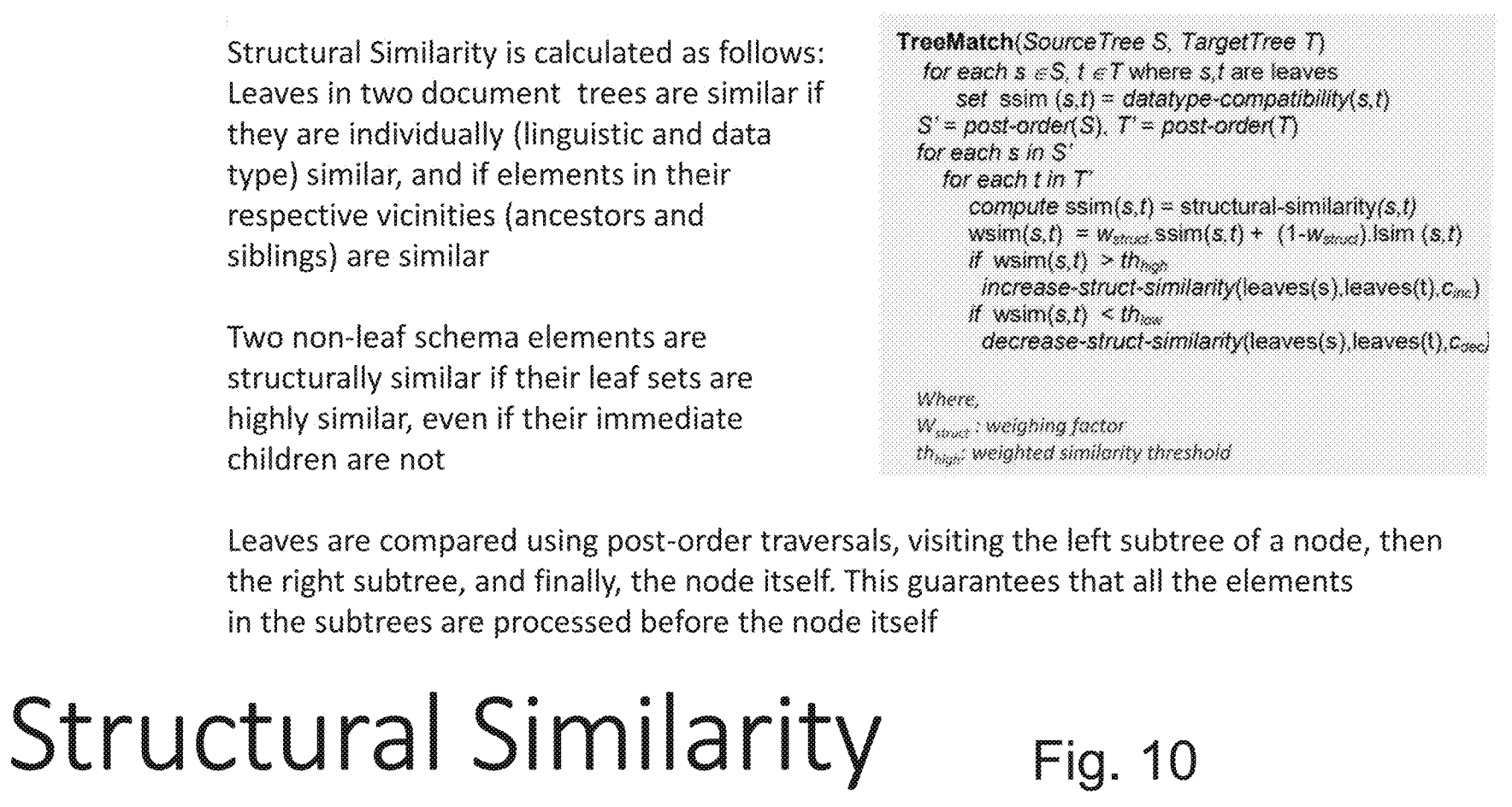

```
TreeMatch(SourceTree S, TargetTree T)
  for each s ∈S, t ∈T where s,t are leaves
    set ssim (s,t) = datatype-compatibility(s,t)
  S' = post-order(S), T' = post-order(T)
  for each s in S'
    for each t in T
      compute ssim(s,t) = structural-similarity(s,t)
```
$$wsim(s,t) = w_{struct} \cdot ssim(s,t) + (1 - w_{struct}) \cdot lsim(s,t)$$
```
      if wsim(s,t) > th_high
        increase-struct-similarity(leaves(s),leaves(t),c_inc)
      if wsim(s,t) < th_low
        decrease-struct-similarity(leaves(s),leaves(t),c_dec)

Where,
  w_struct : weighing factor
  th_high : weighted similarity threshold
```

Structural Similarity is calculated as follows:

Leaves in two document trees are similar if they are individually (linguistic and data type) similar, and if elements in their respective vicinities (ancestors and siblings) are similar Two non-leaf schema elements are structurally similar if their leaf sets are highly similar, even if their immediate children are not Leaves are compared using post-order traversals, visiting the left subtree of a node, then the right subtree, and finally, the node itself. This guarantees that all the elements in the subtrees are processed before the node itself

Structural Similarity     Fig. 10

Fig. 12

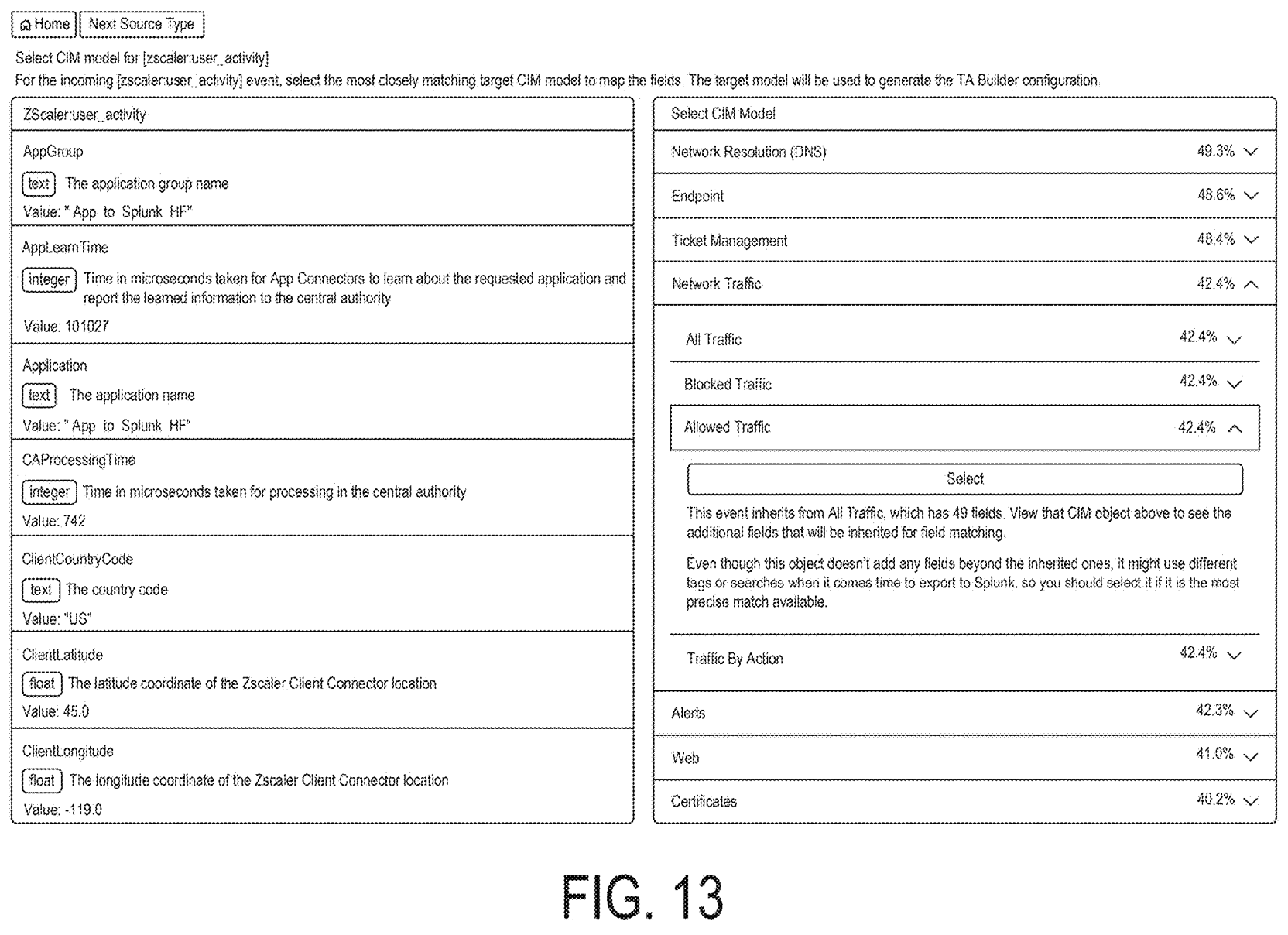

Home | Next | Next Source Type

Select CIM model for [zscaler:user_activity]

For the incoming [zscaler:user_activity] event, select the most closely matching target CIM model to map the fields. The target model will be used to generate the TA Builder configuration.

ZScaler:user_activity

AppGroup
[text] The application group name
Value: " App to Splunk HF"

AppLearnTime
[integer] Time in microseconds taken for App Connectors to learn about the requested application and report the learned information to the central authority
Value: 101027

Application
[text] The application name
Value: " App to Splunk HF"

CAProcessingTime
[integer] Time in microseconds taken for processing in the central authority
Value: 742

ClientCountryCode
[text] The country code
Value: "US"

ClientLatitude
[float] The latitude coordinate of the Zscaler Client Connector location
Value: 45.0

ClientLongitude
[float] The longitude coordinate of the Zscaler Client Connector location
Value: -119.0

Select CIM Model

| | |
|---|---|
| Network Resolution (DNS) | 49.3% v |
| Endpoint | 48.6% v |
| Ticket Management | 48.4% v |
| Network Traffic | 42.4% < |
| All Traffic | 42.4% v |
| Blocked Traffic | 42.4% v |
| Allowed Traffic | 42.4% < |
| Select | |
| Traffic By Action | 42.4% v |
| Alerts | 42.3% v |
| Web | 41.0% v |
| Certificates | 40.2% v |

This event inherits from All Traffic, which has 49 fields. View that CIM object above to see the additional fields that will be inherited for field matching.

Even though this object doesn't add any fields beyond the inherited ones, it might use different tags or searches when it comes time to export to Splunk, so you should select it if it is the most precise match available.

FIG. 13

Figure 14:
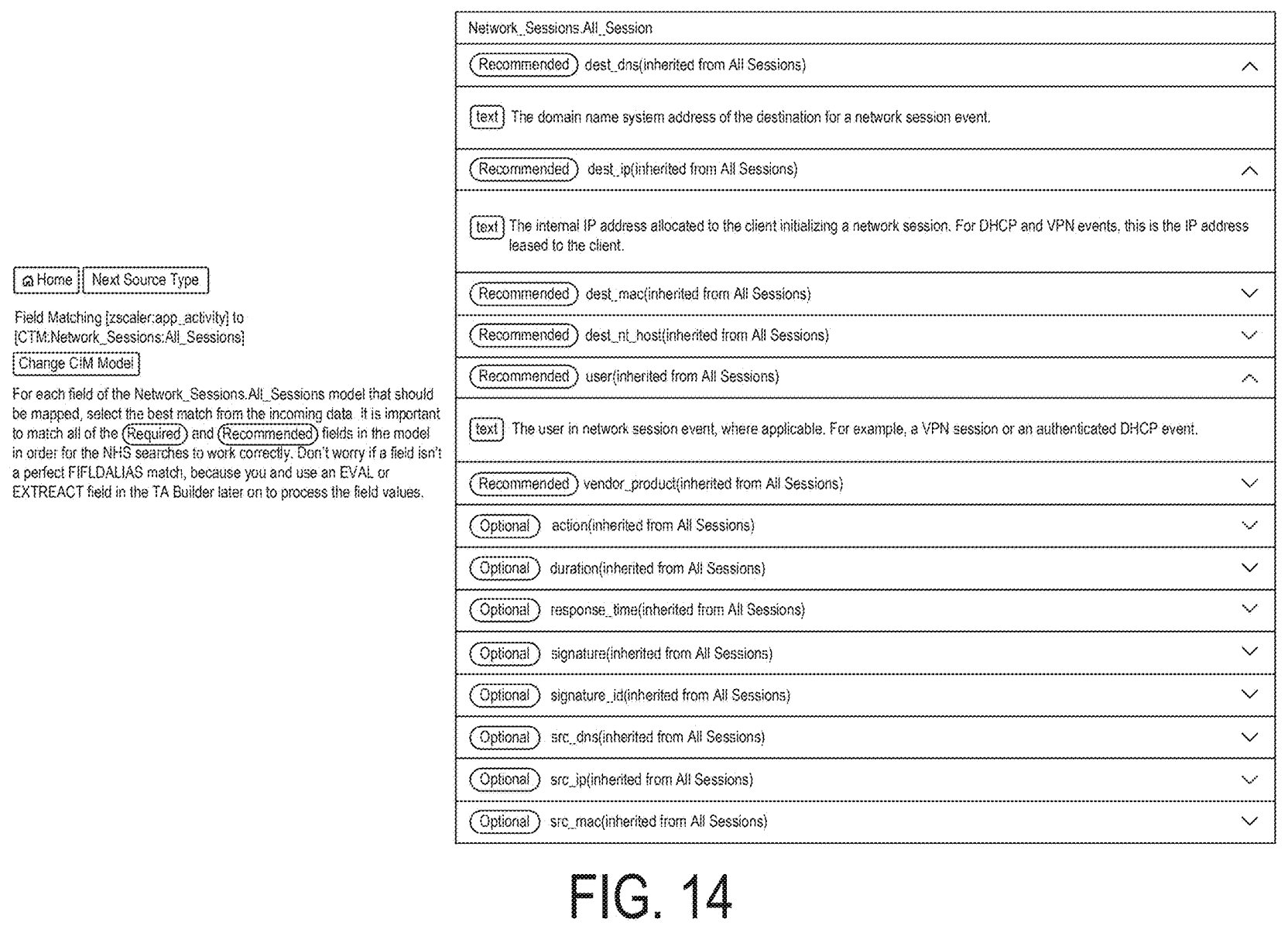

Home | Next Source Type

Field Matching [zscaler:app_activity] to
[CTM:Network_Sessions:All_Sessions]

Change CIM Model

For each field of the Network_Sessions:All_Sessions model that should be mapped, select the best match from the incoming data. It is important to match all of the (Required) and (Recommended) fields in the model in order for the NHS searches to work correctly. Don't worry if a field isn't a perfect FIELDALIAS match, because you and use an EVAL or EXTRACT field in the TA Builder later on to process the field values.

Network_Sessions:All_Session (Recommended) dest_dns(inherited from All Sessions)

[text] The domain name system address of the destination for a network session event.

(Recommended) dest_ip(inherited from All Sessions)

[text] The internal IP address allocated to the client initializing a network session. For DHCP and VPN events, this is the IP address leased to the client.

(Recommended) dest_mac(inherited from All Sessions)

(Recommended) dest_nt_host(inherited from All Sessions)

(Recommended) user(inherited from All Sessions)

[text] The user in network session event, where applicable. For example, a VPN session or an authenticated DHCP event.

(Recommended) vendor_product(inherited from All Sessions)

(Optional) action(inherited from All Sessions)

(Optional) duration(inherited from All Sessions)

(Optional) response_time(inherited from All Sessions)

(Optional) signature(inherited from All Sessions)

(Optional) signature_id(inherited from All Sessions)

(Optional) src_dns(inherited from All Sessions)

(Optional) src_ip(inherited from All Sessions)

(Optional) src_mac(inherited from All Sessions)

⊙ Creating TA for ZScaler

| ⌂ Home | ⬇ Export |
|---|---|

Prop.conf Stanzas

[app_activity]

Add New Stanza ⓘ

| Stanza Name | ⓘ |
|---|---|

Source Types
app_activity (Matched)

CIM Model
Alerts.Alerts

Add Stanza

Editing [app_activity]

Stanza Configuration ⓘ

Source type names use the following foramt : vendor:product : technology : format. ⓘ

The shortest source type name is used to distinguish it from other source types. For example, if the vendor provides only a single format, then :format is not included in the source type name. if the vendor's product does not provide different log formats or sources for different technologies, then :technology is not included in the source type name. For example, the Splunk Add-on for OSSEC has a single source type called ossec. This source type name uses only on of the naming components because the add-on collects only one kind of data from the vendor, OSSEC.

| Stanza Name<br>app_activity | Source Types<br>app_acivity (Matched) | CIM Model<br>Network_Sessions.All_Session | Save |
|---|---|---|---|

Basic Configuration Options ⓘ
New Basic Configuration

| Key<br>description = <string> | description = <string> | Create |
|---|---|---|

Field Configuration Options ⓘ
New Field Configuration

| Field Type<br>FIELDALIAS | Class Name | = | Original Field Name<br>LogTimestamp | AS or ASNEW<br>AS | New Field Name<br>action | Create |
|---|---|---|---|---|---|---|
| Field Type<br>FIELDALIAS | Class Name<br>src_catgory | = | Original Field Name<br>AppGroup | AS or ASNEW<br>AS | New Field Name<br>action | |
| Field Type<br>FIELDALIAS | Class Name<br>dest_mac | = | Original Field Name<br>AppLearnTime | AS or ASNEW<br>AS | New Field Name<br>dest_mac | |
| Field Type<br>EXTRACT | Class Name<br>user | = | Regex Extraction Value<br>\w*: (.*) | in | Source Field Name<br>Application | |
| Field Type<br>FIELDALIAS | Class Name<br>user_priority | = | Original Field Name<br>ClientCountryCode | AS or ASNEW<br>AS | Name Field Name<br>action | |
| Field Type<br>FIELDALIAS | Class Name<br>src_mac | = | Original Field Name<br>ClientPublicIP | AS or ASNEW<br>AS | Name Field Name<br>src_mac | |
| Field Type<br>FIELDALIAS | Class Name<br>user_bunit | = | Original Field Name<br>ClientZEN | AS or ASNEW<br>AS | Name Field Name<br>action | |
| Field Type<br>FIELDALIAS | Class Name<br>signature_id | = | Original Field Name<br>ConnectionID | AS or ASNEW<br>AS | Name Field Name<br>signature_id | |
| Field Type<br>FIELDALIAS | Class Name<br>duration | = | Original Field Name<br>ConnectionSetupTime | AS or ASNEW<br>AS | Name Field Name<br>duration | |
| Field Type<br>FIELDALIAS | Class Name<br>Sec_priority | = | Original Field Name<br>ConnectionStatus | AS or ASNEW<br>AS | Name Field Name<br>action | |
| Field Type<br>FIELDALIAS | Class Name<br>dest_category | = | Original Field Name<br>Connector | AS or ASNEW<br>AS | Name Field Name<br>action | |
| Field Type<br>FIELDALIAS | Class Name<br>dest_ip | = | Original Field Name<br>ConnectorIP | AS or ASNEW<br>AS | Name Field Name<br>dest_ip | |
| Field Type<br>FIELDALIAS | Class Name<br>src_bunit | = | Original Field Name<br>ConnectorZEN | AS or ASNEW<br>AS | Name Field Name<br>action | |

FIG. 16

CYBERSECURITY EVENT HANDLING AND ENRICHMENT SYSTEM

RELATED APPLICATION

This application claims the benefit of U.S. Provisional Patent Application Ser. No. 63/539,214, entitled Cybersecurity Event Handling and Enrichment System, filed on Sep. 19, 2023, the contents of which are incorporated herein by reference in their entirety for all purposes.

BACKGROUND

Technical Field

This invention relates to cyber security, and more particularly to a system and method that provides cybersecurity specific language translation to a common ontology rather than to a vendor specific framework.

BACKGROUND INFORMATION

Cybersecurity threats and attackers require reconnaissance and vulnerability exploitation across multiple systems to gain the information, access, and authority they require. Over time, defensive technologies have been developed to provide protection in each of these security domains, like endpoint systems, cloud services, firewalls, or email gateways. Vendors who offer solutions in one or more of these areas report findings in their own proprietary language, forcing defenders to become and remain experts in the many dialects of the technologies they employ. Similarly, attempts at orchestration and automation, like SOAR (Security Orchestration, Automation and Response) technologies, are limited by the complexity and variability of data that underpins their analytics. There is a need for a system and method that provides cybersecurity specific language translation to a common ontology rather than to a vendor specific framework, e.g., using natural language processing.

SUMMARY

The appended claims may serve as a summary of the invention. In addition, it should be noted that to address the aforementioned drawbacks, the inventors have developed a solution capable of translating events from disparate vendors and technology types into a common ontology through the creation of a cybersecurity-specific combination of Natural Language Processing (NLP), machine learning, and artificial intelligence, referred to herein as Cyber-Specific Language Processing or CSLP. Embodiments of the present invention include a translator that extracts the common and most important elements of security device telemetry data, a platform capable of high-volume data ingestion and enrichment, an accessible data abstraction layer that can be used to generate platform-agnostic outbound interfaces for reporting and alerting, a platform capable of assisting users with ingesting data to a common information model on an ad-hoc basis, and additional interfaces for configuration and data manipulation activities.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which:

FIG. 2 is a listing of alert structures usable by embodiments of the present invention;

FIG. 4 is a listing of an output alert structure generated by embodiments of the present invention;

FIG. 6 is a listing of pre-processing steps of embodiments of the present invention;

FIG. 8 is a listing of matching steps of embodiments of the present invention;

FIG. 9 is a listing of a linguistic similarly algorithm useful in embodiments of the present invention;

FIG. 10 is a listing of a structural similarly algorithm useful in embodiments of the present invention;

FIG. 12 is an example of a screen shot generated by a User Interface of embodiments of the present invention;

FIG. 13 is an example of a screen shot generated by a User Interface of embodiments of the present invention;

FIG. 14 is an example of a screen shot generated by a User Interface of embodiments of the present invention;

FIG. 15 is an example of a screen shot generated by a User Interface of embodiments of the present invention; and FIG. 16 is an example of a screen shot generated by a User Interface of embodiments of the present invention.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

As used in the specification and in the appended claims, the singular forms "a", "an", and "the" include plural referents unless the context clearly indicates otherwise. For example, reference to "a vendor" includes a plurality of such vendors.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

Referring now to the referenced Figures, embodiments of the present invention will be described.

Translation and Accessibility

CSLP is a new advancement in AI and ML-based language processing because it addresses several challenges and opportunities specific to cyber security. Embodiments of this invention embody a new objective for language modeling: the creation of a resilient single data repository optimized to sanitize, index, and store, cybersecurity event data from an evolving set of cybersecurity vendors and technologies. These embodiments include cyber security-specific language types and models capable of translating event information across both vendor and device message types.

Figure 1:
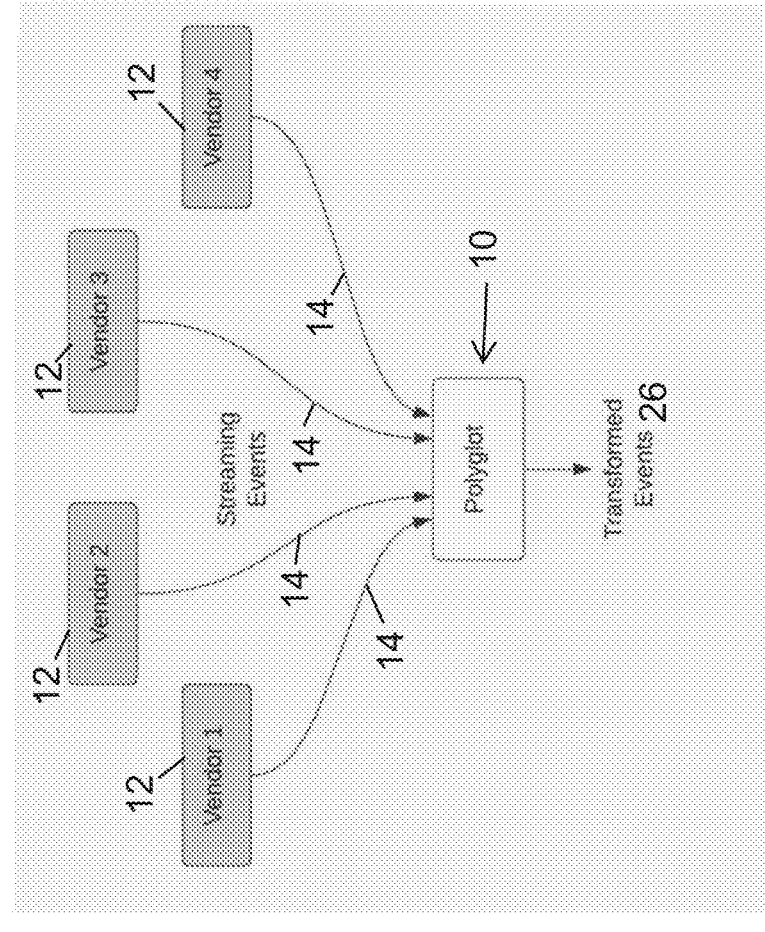
FIG. 1 is a block diagram of aspects of embodiments of the present invention.

The translation process is multi-step and includes the following stages which will be shown and described with reference to FIGS. 1-4:

As shown in FIG. 1, a listening Polyglot Threat Handler Processor 10 waits for a connection from other conventional systems 12 (e.g., Vendor) and for alerts (events) 14 that will be passed through that connection. Service connection is thus received by Polyglot 10 from Vendor(s) 12. In various embodiments, Vendor(s) 12 is running one or more of a conventional connected security solution, a log/event forwarder, or an agent capable of gathering and even preprocessing data. In some applications, this connection can be performed on an ad-hoc basis, where users will upload all the data they wish to ingest, and the system will run against that data, instead of in a long-running process waiting for data to stream in.

In representative embodiments, Polyglot 10 checks its list of covered systems and services, verifying that it can accept a connection from Vendor(s) 12. If so, the connection is accepted and the pending event 14 is signaled for send, resulting in ingestion by Polyglot 10 where it is processed to output transformed event(s) 26 (FIGS. 1 and 4) as discussed in greater detail hereinbelow.

It should be noted that each Vendor/System 12 may be unique, e.g., each representing mutually distinct vendors/device types which may describe the same event using mutually distinct formats and/or terminologies. Examples of some common Vendor/Systems 12 include those commercially available from Crowdstrike, Threatlocker, Sophos, Broadcom, and Fortinet, etc.

As shown in FIG. 2, examples of two of the same alerts from different vendors 12, in mutually distinct formats and terminologies, are shown at 14' and 14". In the first example 14', the event is described using the terms "event_id, event_type, event_category and event_description. In the second example 14", the same event is described using the terms AlertID, AlertTerms and AlertDescription. As will be described in greater detail hereinbelow, embodiments of the present invention effectively create an abstraction layer to translate both of these examples into a single common ontology. Examples of such a common ontology that may be used with embodiments of the present invention include OCSF (Open Cybersecurity Schema Framework), which is an open-source security schema for common security events, or Splunk CIM (Common Information Model), from Splunk, Inc. (San Francisco, CA). The Splunk CIM is a semantic model implemented as an add-on that contains a collection of data models, documentation, and tools that support the consistent, normalized treatment of data to match a common standard.

For convenient explication, the following description will ignore any communications/caching/error-recovery capability and presume that the event 14 lands in its full form, likely as a JSON or XML object.

Figure 3A:
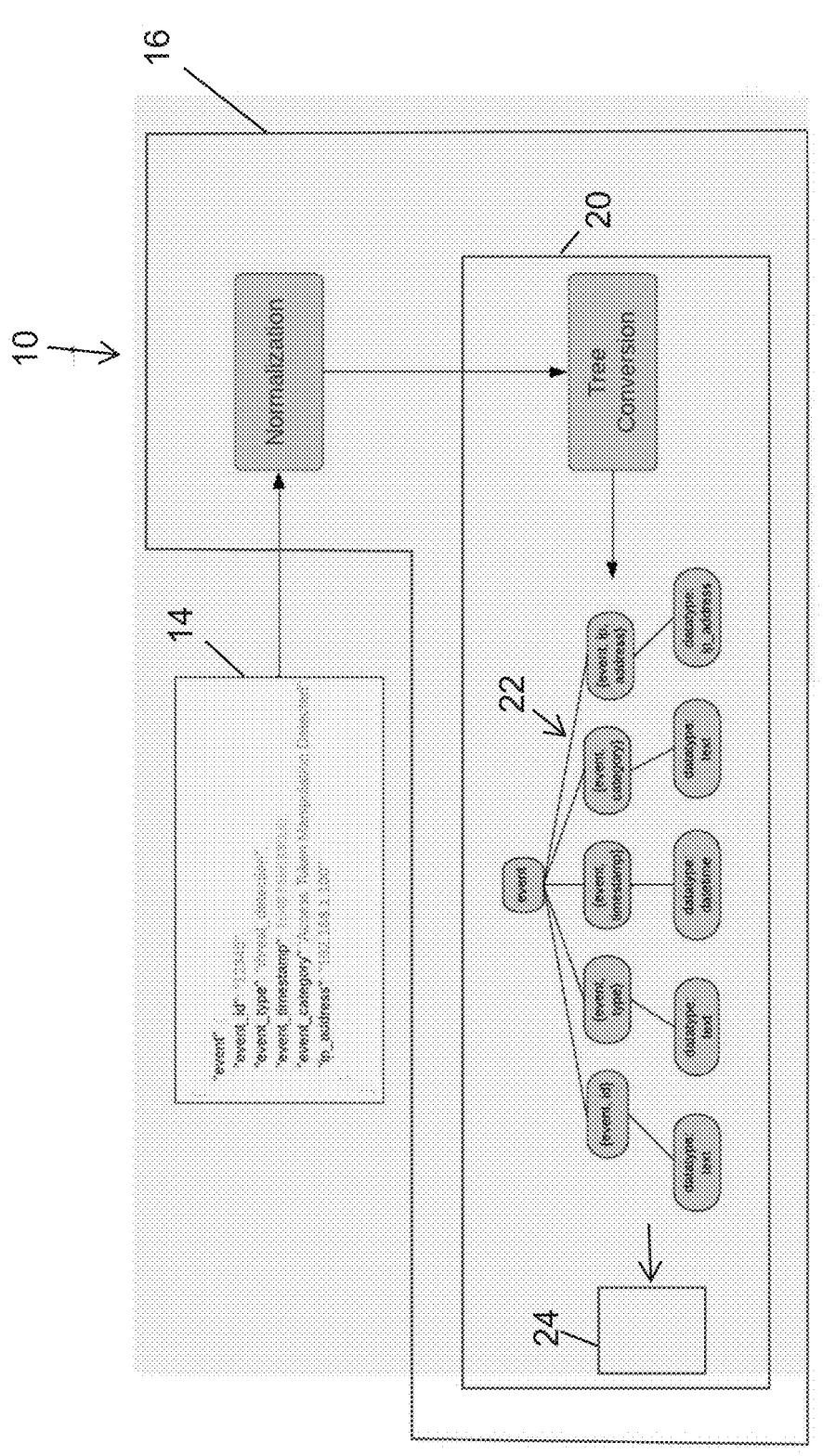
FIG. 3A is a block diagram of aspects of embodiments of the present invention.

Referring to FIG. 3A, an initial step in the translation is the parsing of the content of event 14 into an appropriate representation, e.g., a tree 22 in representative embodiments. The parsing is dependent on the format of the event as sent. As shown, this step uses a Normalizer 16 to normalize event 14, which in particular embodiments, includes conventional Feature Extraction (e.g., semantic text matching), and Word Embeddings algorithms, 30 and 32 (FIG. 5) to extract identifiers such as description, name, and category, and convert them to Word Embedding Vectors (also referred to as Tokenization), which are then used by Tree Converter 20, to generate a tree 22. An example of a Feature Extraction module 30 useful with embodiments hereof, includes the sklearn.feature_extraction module, while useful examples of Word Embedding modules 32 include TF-IDF, Word2Vec, and GloVe.

In particular embodiments, Tree Converter 20 builds tree 22 as follows:

a) The root of the tree is the System service source of the event.

b) The trunk of the tree is the event, given a unique name or id by Polyglot while it is processed and its characteristics enumerated.

c) From the event come the branches which are characteristics of the event. These would include all the fields that express the nature of the event, from name, to time, to descriptive fields like urgency, type, etc. Because some characteristics may have multiple associated values, there may be multiple levels of branches.

d) At the end of the branches are the leaves, which are the values of the characteristics at the widest branch level.

The completed tree 22 contains the various elements and values of those elements, as shown. Optionally, in particular embodiments, tree 22 may be more fully enriched through an analysis of the leaves, to look for additional information that will categorize the element as a knowable datatype, such as datetime, ip_address, string, etc. This information is then added to the tree 22 to form an enriched tree 22'.

Figure 3B:
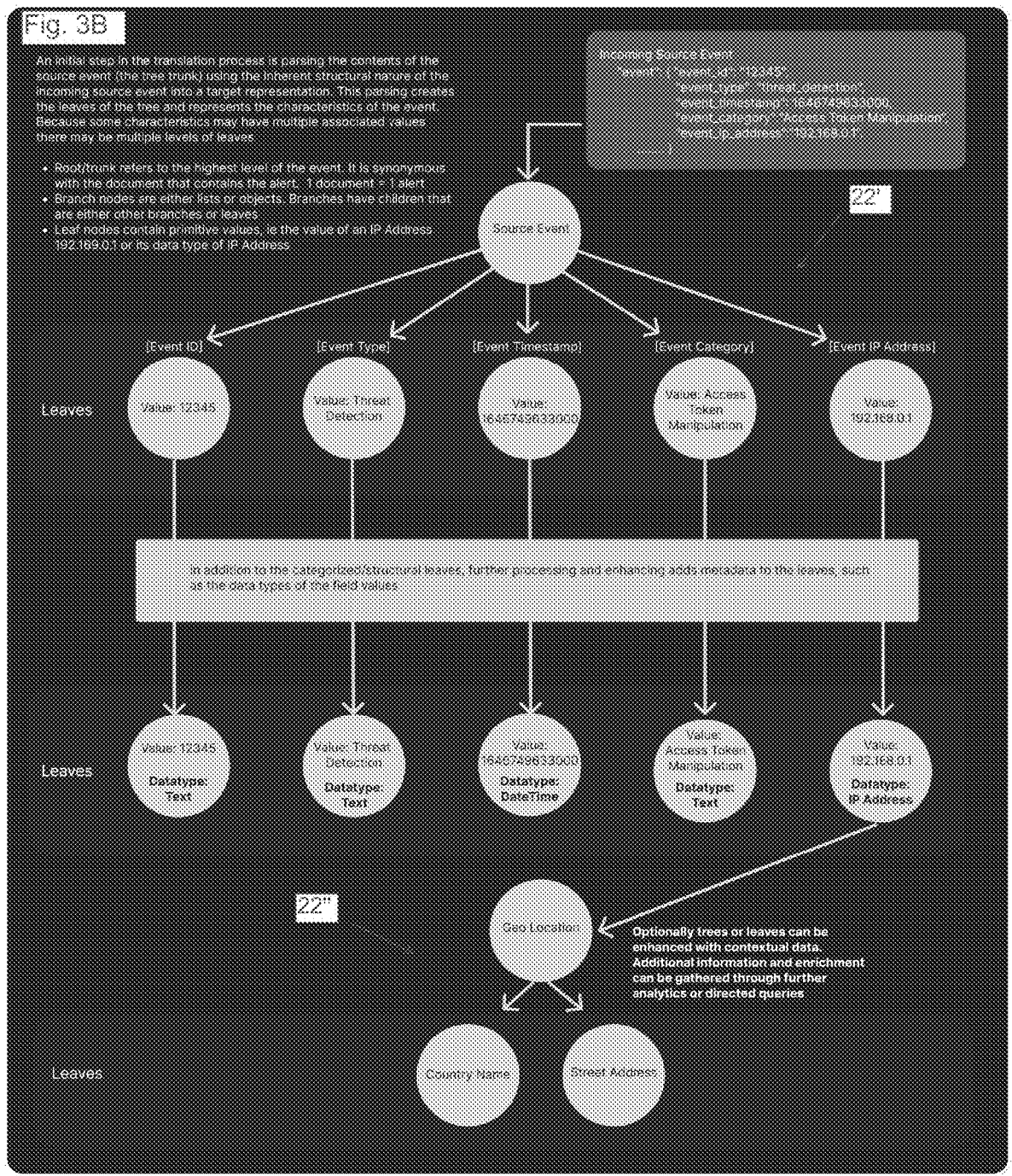
FIG. 3B is a functional diagram of a tree illustrating features of the embodiments of FIGS. 1-3.

An example of an enriched tree 22' is shown in FIG. 3B. In another optional extension, in particular embodiments, the leaves of either tree 22 or enriched tree 22' can also be augmented with contextual data beyond that which is available or obvious from the original event such as shown at 22" in FIG. 3B. This information can be gathered through additional queries, or can be added as the result of analytics against a broader set of data that the system has been taught to associate with either the specific leaf or a combination of leaves in the enriched tree.

Tree Converter 20 then algorithmically translates the completed tree 22, 22', 22" into a mathematical format, e.g., in JSON or XML format, shown and described hereinbelow as Event JSON 24.

Figure 5:
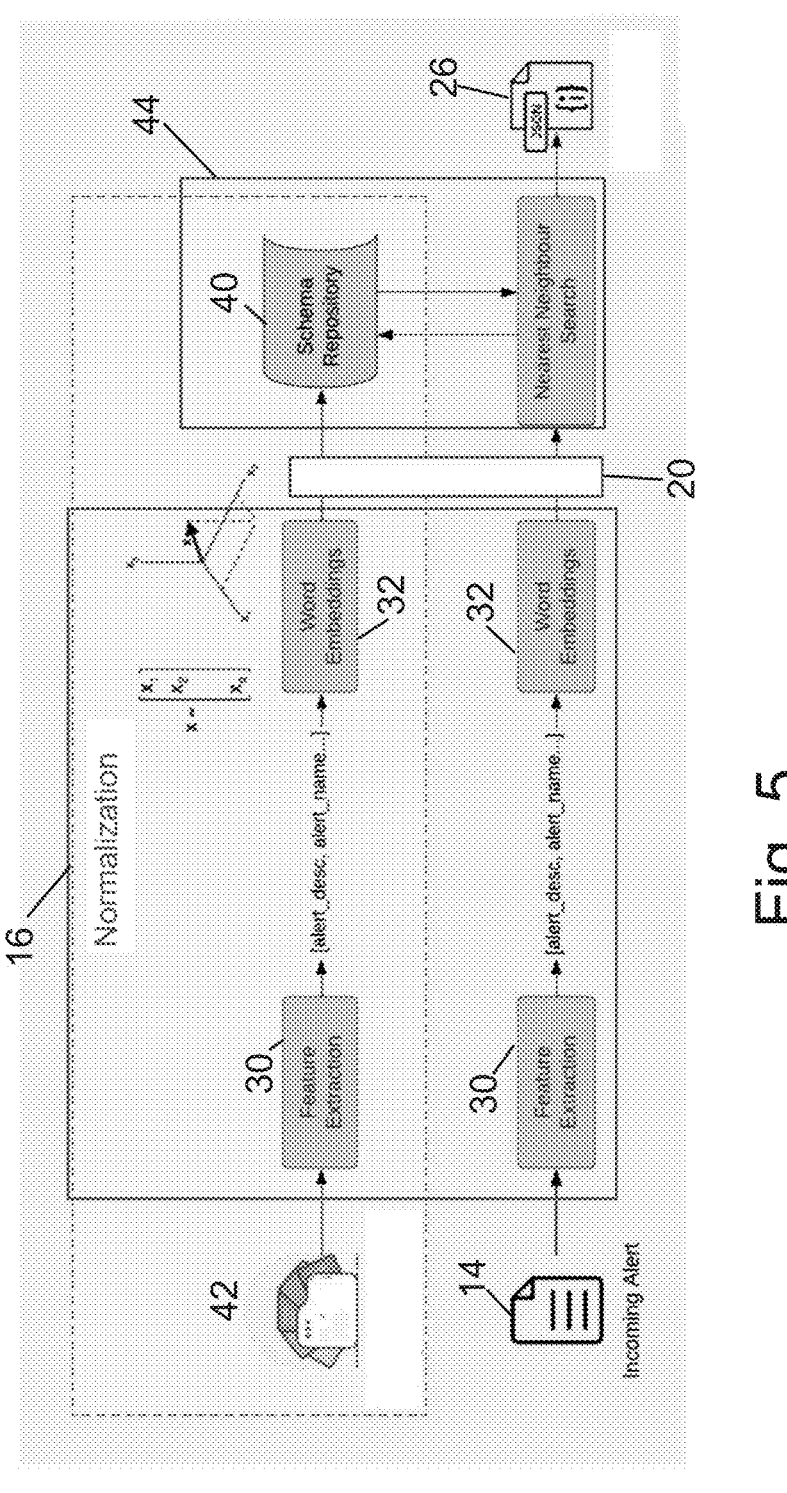
FIG. 5 is a block diagram of aspects of embodiments of the present invention.
Figure 7:
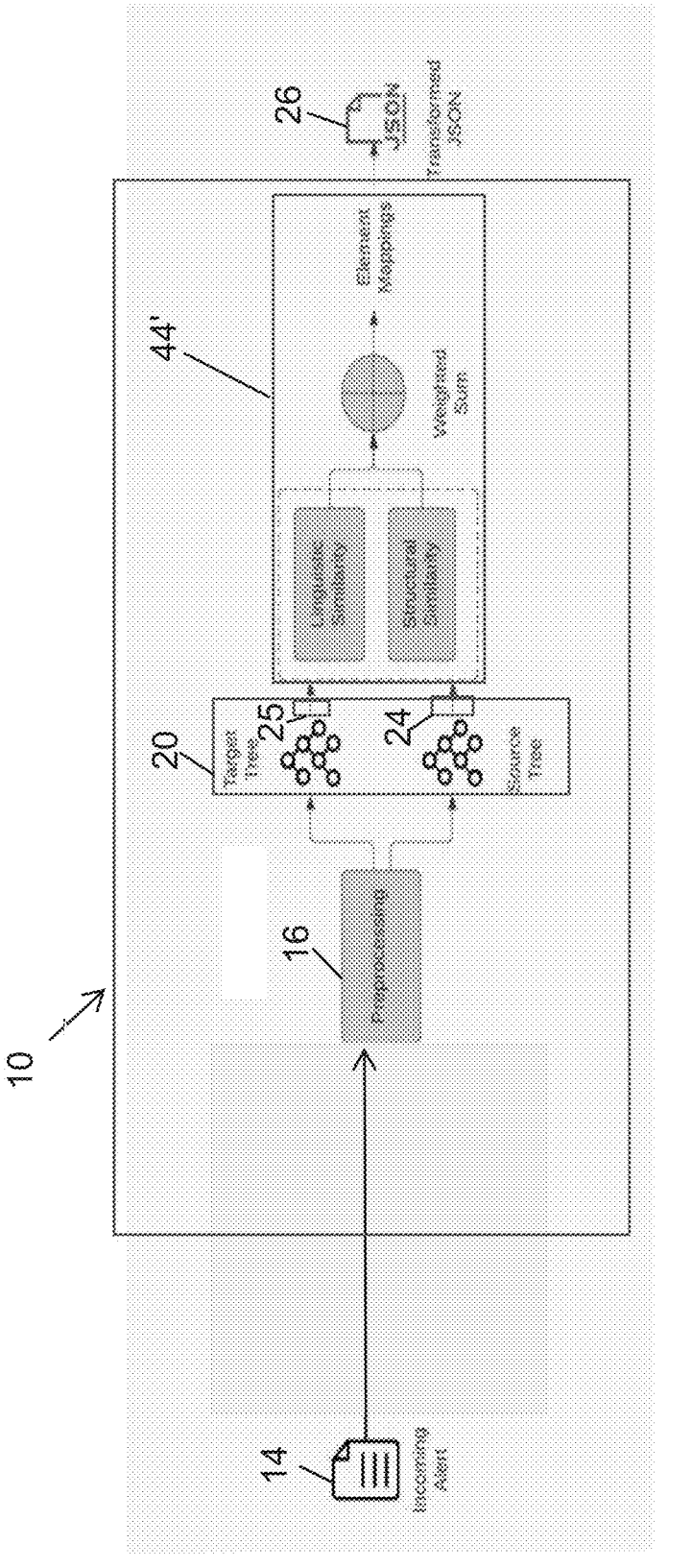
FIG. 7 is a block diagram of aspects of embodiments of the present invention.

Event JSON 24 enables automated comparison against target language representations of various known events within a Universal Target Schema (referred to as UTS or Target Schema) 40 (FIG. 5). In particular embodiments, the aforementioned OCSF and/or Splunk CIM, modified in accordance with the teachings herein, serves as UTS 40. In various embodiments, these target language representations of known events may be generated by inputting various known events 42 (FIG. 5), e.g., from multiple vendors 12, to Normalizer 16 and Tree Converter 20, for processing substantially as shown and described hereinabove, to generate trees which are then mathematically formatted in JSON or XML, shown and described herein as UTS JSONs 25 (FIG. 7). An example of a UTS JSON which has been matched to events 14', 14" of FIG. 2, and then outputted by System 10 as transformed event 26, is shown in FIG. 4.

It should be recognized that UTS 40 includes a corpus of pre-processed UTS JSONs 25, to effectively form a common ontology/language into which the incoming events 14 are translated. And although Event JSONs and UTS JSONs are shown and described as being disposed in JSON format, it should be recognized that substantially any format, including plain text, may be used without departing from the scope of the present invention.

Embodiments of the invention thus use event trees 22 to describe alerts/events 14 in a detailed manner, e.g., as Event JSONs 24, that may then be mapped consistently to the UTS 40, e.g., via the aforementioned mathematical format/UTS JSON 25. The UTS 40 provides a universal format that may be conveniently used by security management tools and analytics host systems for further processing.

Turning now to FIGS. 5-10, as mentioned hereinabove, exemplary steps used by various embodiments to generate the transformed event(s) (also referred to herein as Alert Classifications) 26, from events 14, will now be described in greater detail. In these embodiments, Normalizer 16 performs:

1. Feature Extraction from incoming events—As best shown in FIGS. 5 and 6, features are extracted at 30, from incoming alerts/events 14, e.g., using semantic text matching to extract identifiers such as alert description, alert name, and alert category/categorization, which are converted to Word Embedding Vectors at 32 (also referred to as Tokenization and Categorization). Tree Converter 20 then converts the normalized events into tree structures 22 and then Event JSONs 24 as described hereinabove with respect to FIG. 3A;

2. Feature Extraction/Preprocessing—known events 42 are preprocessed by performing feature extraction at 30 and converting to Word Embedding Vectors at 32 to generate normalized events. Tree Converter 20 then converts the normalized events into tree structures 22 and then UTS JSONs 25 as described hereinabove with respect to FIG. 3A; and 3. Schema Mapping—Transformer 44 (FIG. 5) runs a Nearest Neighbor Search algorithm, such as the conventional K-Nearest Neighbor (KNN) Algorithm, for Event JSON 24, to find the best matching UTS JSON 25 within UTS 40, which is then outputted as Transformed Event 26. Optionally, Transformer 44' (FIG. 7)

runs linguistic and structural matching algorithms such as shown in FIGS. 8-10, for Event JSON 24 to find the best matching UTS JSON 25 within UTS 40, which is then outputted as Transformed Event 26.

In particular embodiments, when there are roughly equal matches between multiple elements within the target representation, the full tree is traversed in reverse to identify other recognizable terms that will clarify and improve the match to find the best fit.

It should be noted that in these steps, the events that are being translated, and the representation they are being translated into, are derived from a domain-specific set of cybersecurity terms and in the format of computer-generated events and activity. The inventors' application of these natural language processing techniques has been developed to recognize the unique structure, uncommon and rapidly changing vocabulary, and evolving definitions of both messages and message elements. These elements are also individually identified and recorded to provide easier indexes for future cybersecurity-related natural language queries for use in the process of analyst incident investigation or automated cybersecurity analytics.

Practically, a large subset of the terms and phrases to be translated are not in any dictionary. They are created by developers and vendors to a specific technical purpose and will not be found in any common large or small language models. Examples are element names (event_id, process_context, AlertInfo) and event types ("defensive evasion", "Golden Ticket", "brute-force"). It isn't just that the terms are being used in unique ways, it is that the terms are often not words used in any written or spoken language. They are more like labels, and we are translating the labels of elements within a technical infrastructure, not looking to compose a thought. The resulting common translation into Elements of Interest (EOI) provides the footing for the later-described analytics and queries.

Optionally, a new and more concise model can be used, one that is trained solely on data comprised of this expanding set of unique cybersecurity terms. In this model, the vocabulary is not created through the addition of the lexicons of cybersecurity tools to existing language models, but is created from only these terms. This style of analysis provide the best performance for the specific ingestion of cybersecurity logging and event information, but may be combined with the broader and inclusive language to deliver simplified access to gathered information and analytics through human natural language queries.

Automated Extension of Target Ontology

Spoken and written languages are vast, with English alone accounting for over one million words. Changes to major languages happen, but new words are infrequent (0.065% change in 2022) and fundamental changes to the structure of language doesn't happen. As a result, existing approaches to language translation, like NLP, can rely on a consistent base of terms and structures from which they can learn the appropriate elements for translation.

In contrast, the cybersecurity vocabulary, as described comprehensively by the National Institute of Science and Technology, has less than 10,000 terms within it. The body of terms is much smaller but change is more frequent as attacks, enabling technologies, and industry jargon change. Further, the structure of messages or events containing this blend of new and existing technology changes with new vendors, protection technologies, and standards.

To support this constantly evolving lexicon, embodiments of the invention use a series of threshold-based tests to trigger automatic extension of the target ontology, or to alert users that the target ontology may need to be updated manually if it is a fixed schema, such as the Splunk CIM as modified in accordance with the teachings herein, to include new terms or structures that represent output from specific vendors or output associated with a specific type of device or attack.

For example, various embodiments of the present invention may execute algorithms shown and described in the following pseudo code:

```
Configurable threshold_variable
target_schema = common ontology
incoming_schema = the document we are trying to translate
to the common ontology
if (target_schema – threshold_variable) > 1 standard
deviation from the
incoming_schema
then
    identify new schema elements from incoming schema
    add those elements to the target schema
    regenerate the mathematical representation of the target schema
    run comparison of incoming_schema to newly updated target_schema
    repeat until there is a match less than 1 standard deviation
end.
```

The process of creating the threshold event occurs at the computation of the automated mathematical comparison between the source event and the potential matches in the target ontology. If none of the target events within the representation is within a specified tolerance of similarity, the source event, including all of its original elements and structure, are passed to an ontology extension utility that both adds the event to the lexicon and calculates the appropriate mathematical representation for future use.

In order to adequately tune and maintain consistency within the target language, the specification of tolerance has been developed to be configurable. It is likely that, over time, as the language grows and the cybersecurity industry matures, that higher confidence levels will be possible and that new terms or events will be less common and less unique when compared with the existing body of representative language.

Automatic Accommodation of Existing Queries into New Ontology

As the target representation grows, it is possible that existing mappings of events to a common representation may evolve to a new format that either contains additional information or is delivered in a different structure. Product vendors are likely to enrich existing events with additional data when possible, and the target representation may be required to similarly evolve to represent these new events.

This process is directed towards comparing the target schema elements within the UTS with the incoming schema elements where there is a match. In cases where there is a match of schema elements, we check to see if the data contained in the individual incoming schema elements matches the data for the individual target schema elements. Embodiments of the present invention may provide this functionality by executing algorithms shown and described in the following pseudo code:

```
If incoming_shema.element is not equal to target_schema.element
If not, we have a few choices that could be configurable.
We could take the approach
that the new incoming schema is always correct and replace
what's in the target schema
Set target_schema.element = incoming_schema.element
```

-continued

```
We could also use the schema element with the greater amount of detail
If length of incoming_shema.element > length of target_schema.element
Then
    Set target_schema.element = incoming_shema.element
Else
    Leave it, the target schema is already more detailed.
```

One of the benefits of these embodiments is the automation of analytics and enrichment activities across multiple vendors and device types. Changes in the target ontology would render existing queries inoperable, as the objects of the queries may have had either terminology or structural changes, or both.

Recognizing the need for backwards-compatible translation and representation to deliver effective translation models and to support existing fixed analytics, these embodiments consider the likelihood of these changes and through the combination of identifying and migrating target event schemas, while also revisiting and validating existing queries, automated analytics are made resilient in the presence of changing target ontology elements for matching.

These embodiments incorporate this capability through the use of ongoing monitoring and validation of any changes in the schemas associated with the superset of events represented by the target ontology, and may, where necessary, embed fields within the target language elements, labeling the version of the index. These labels are available to the creators of both analytic and automation operations, ensuring a consistent mapping of desired output to existing data.

It should be noted that a goal of embodiments described herein is to avoid disrupting any current processes of the (e.g., customer's) host systems. These embodiments would not be expected to have access to all of a customer's queries so they cannot reasonably ensure backwards compatibility from that perspective. In light of this, particular embodiments may use one or more of the following approaches to provide backwards compatibility.

A relatively simple approach is to not remove elements from the target schema. Elements that change would be handled by leaving the previous version of the element and adding a new version of the element for the change. In this case any queries built on the target schema would continue to operate.

On the back end embodiments may maintain versions of the vendor specific mapping.

In addition to the functionality discussed above, particular embodiments include the following functionality referred to as Area 4 and Area 5. As will be described in greater detail, the Area 4 functionality includes the identification and mapping of different security technologies and services in order to understand a cost/value relationship, using the translated logging as a proxy for asset and service inventory as well as the source of definition for value. The Area 5 functionality includes uses the translation capability between source and target to derive configuration information to simplify the configuration of security sources into consumable data for security information and event management platforms (SIEMs). The translation discussed hereinabove to create a common event ontology has the additional value of enabling an understanding of the translated elements, providing a means of automating much of the element mapping that is a part of onboarding new security technologies into these platforms. By taking the quantitative outputs of the nearest neighbors search performed on schema elements, a ranking for each field in the incoming event data to fields in the common ontology, the process of onboarding new security technologies is simplified for the user, who can either confirm the best match, or choose one of the other most similar matches ranked by the algorithm if they have prior knowledge to inform them that the highest ranked match may not be the correct one.

Automatic Identification of Security Telemetry Sources and Application

Recognizing the messages and schema from sources within the environment also provides a proxy for the number and types of systems that are currently supporting the software or services producing those messages. Through the capacity to match messages with target alerts, embodiments of the inventions are capable of relating the number, type, and priority of messages that are generated by technologies implemented within the organization.

Understanding the contribution of security technologies and services to overall visibility and cybersecurity effectiveness is a recurring challenge for security leaders. Justifying existing spend and proposing expansion within most areas of business are accomplished through a cost/benefit analysis. This is more difficult with cybersecurity where success is determined by attacks that don't succeed or breaches that do not corrupt internal systems.

Through the capture and translation of security data and its labeling by source and type, these embodiments help to create a clear picture of the deployment, volubility, and value of security investments. Through this unique approach, users will be able to identify gaps in protection, unused resources, and noisy or ineffective solutions within their environment. This analysis may be driven through the combination of AI-driven translation and a second form of analysis that performs aggregation and comparison operations.

Automatic Enumeration of Data Collection Elements

Integration of new sources of telemetry into security information and event management systems (SIEM's) is a time-consuming process that involves mapping the elements of all messages into the expected form required by the SIEM. The above-described ability to model the schema for both the target language and the source language meaningfully simplifies this process.

The techniques and benefits of the initial ontology translation lend themselves to also performing a mapping between elements of the source messages and the corresponding elements within the target ontology. Beyond the benefits defined above, this mapping also allows for the creation of an appropriate configuration of data collector for the target SIEM. A data collector is that element of the SIEM functionality that is responsible for first identifying, then collecting and storing events within the required format for use by SIEM reporting and analytics.

Figure 11:
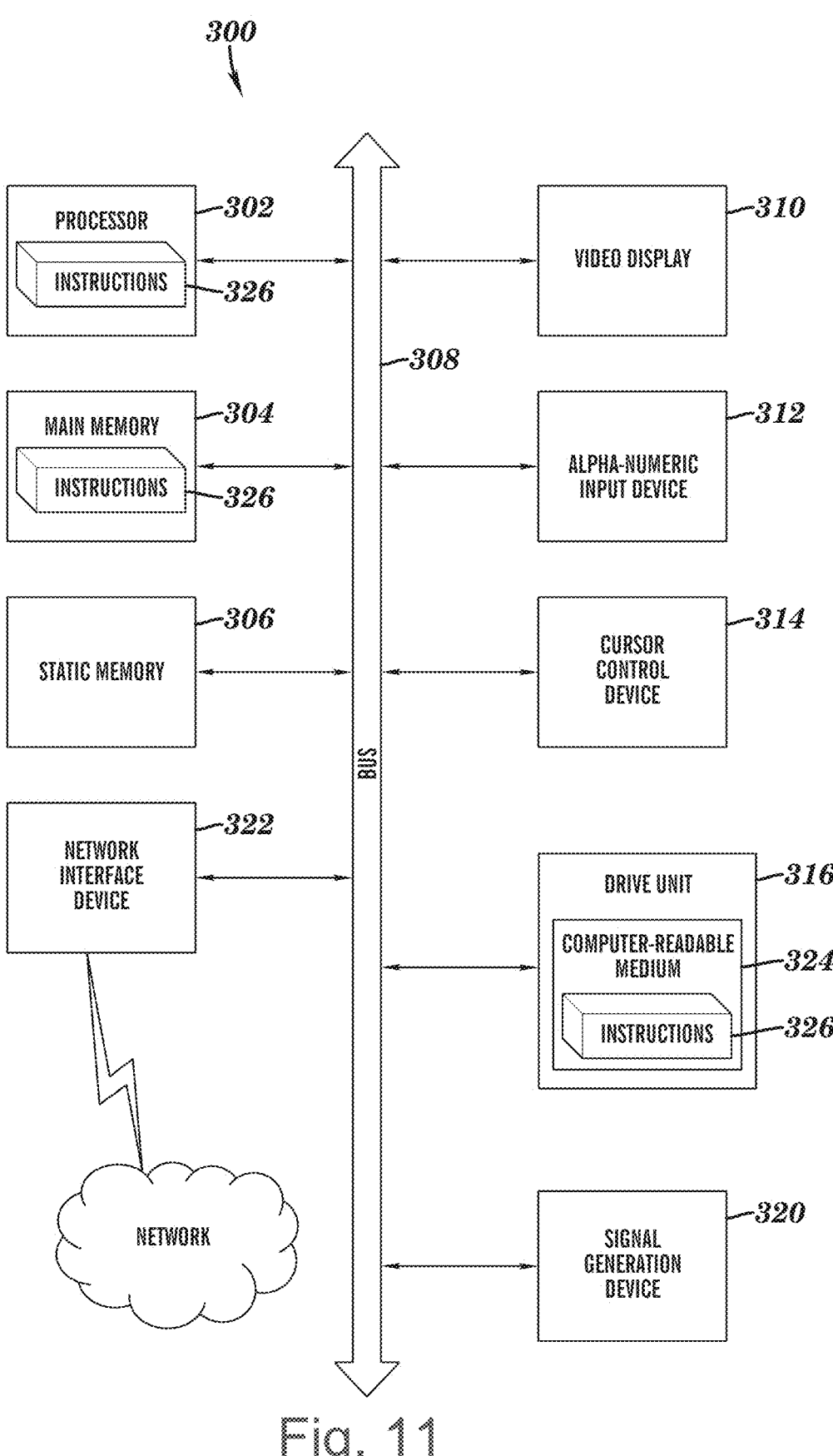
FIG. 11 is a block diagram of a computing element useful in embodiments of the present invention.

FIG. 11 shows a diagrammatic representation of a machine in the exemplary form of a computer system 300 within which a set of instructions, for causing the machine to perform any one of the methodologies discussed above, may be executed. In alternative embodiments, the machine may include a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD), plasma, cathode ray tube (CRT), etc.). The computer system 300 may also include an alpha-numeric input device 312 (e.g., a keyboard or touchscreen), a cursor control device 314 (e.g., a mouse), a drive (e.g., disk, flash memory, etc.) unit 316, a signal generation device 320 (e.g., a speaker) and a network interface device 322.

The drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "computer-readable medium" shall be taken to include any medium that is capable of storing or encoding a sequence of instructions for execution by the computer and that cause the computer to perform any one of the methodologies of the present invention, and as further described hereinbelow.

Figure 12:
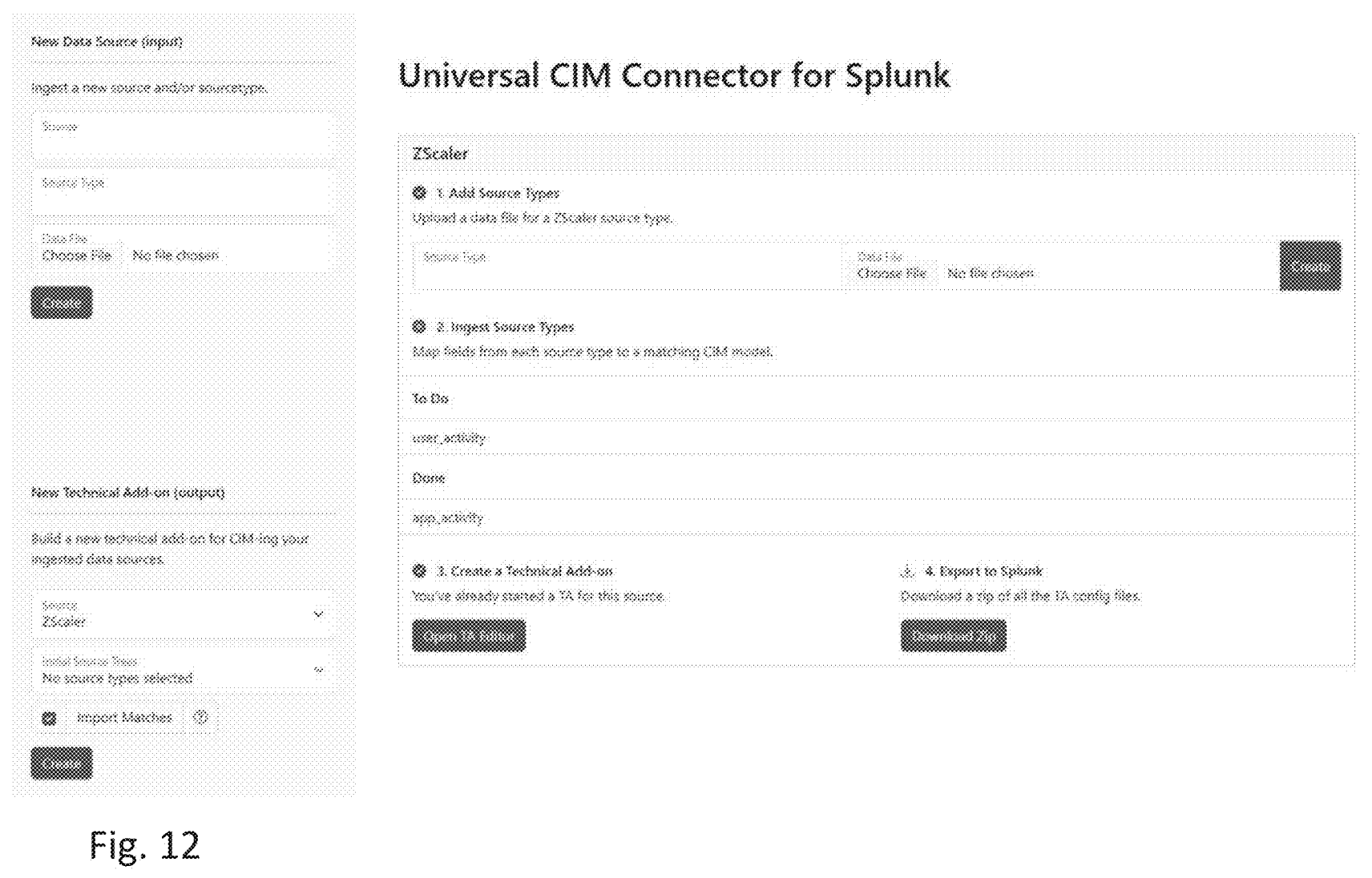

Turning now to FIGS. 12-16, examples of screenshots generated by embodiments of the present invention are shown and described. As shown in FIG. 12, at starting page 400, a user may upload data that they would like to ingest and map to a UTS, e.g., to a Splunk CIM model. The user may also see the data already added and whether it has been processed, and may create/edit a Technical Add-on for the UTS.

As shown in FIG. 13, model selection page 404 permits a user to see the ingested data on the left, and all the possible UTS model selections on the right, ranked by calculated "document similarity". After selecting the best UTS model for the particular source type, the system maps the fields.

In FIG. 14, field matching screen 408 enables a user to see all the fields in the UTS model that need to be mapped and can select which field from the source model is the best fit. This screen is similar to the model matching screen, though displaying fields with similarity values instead of documents.

Figure 15:
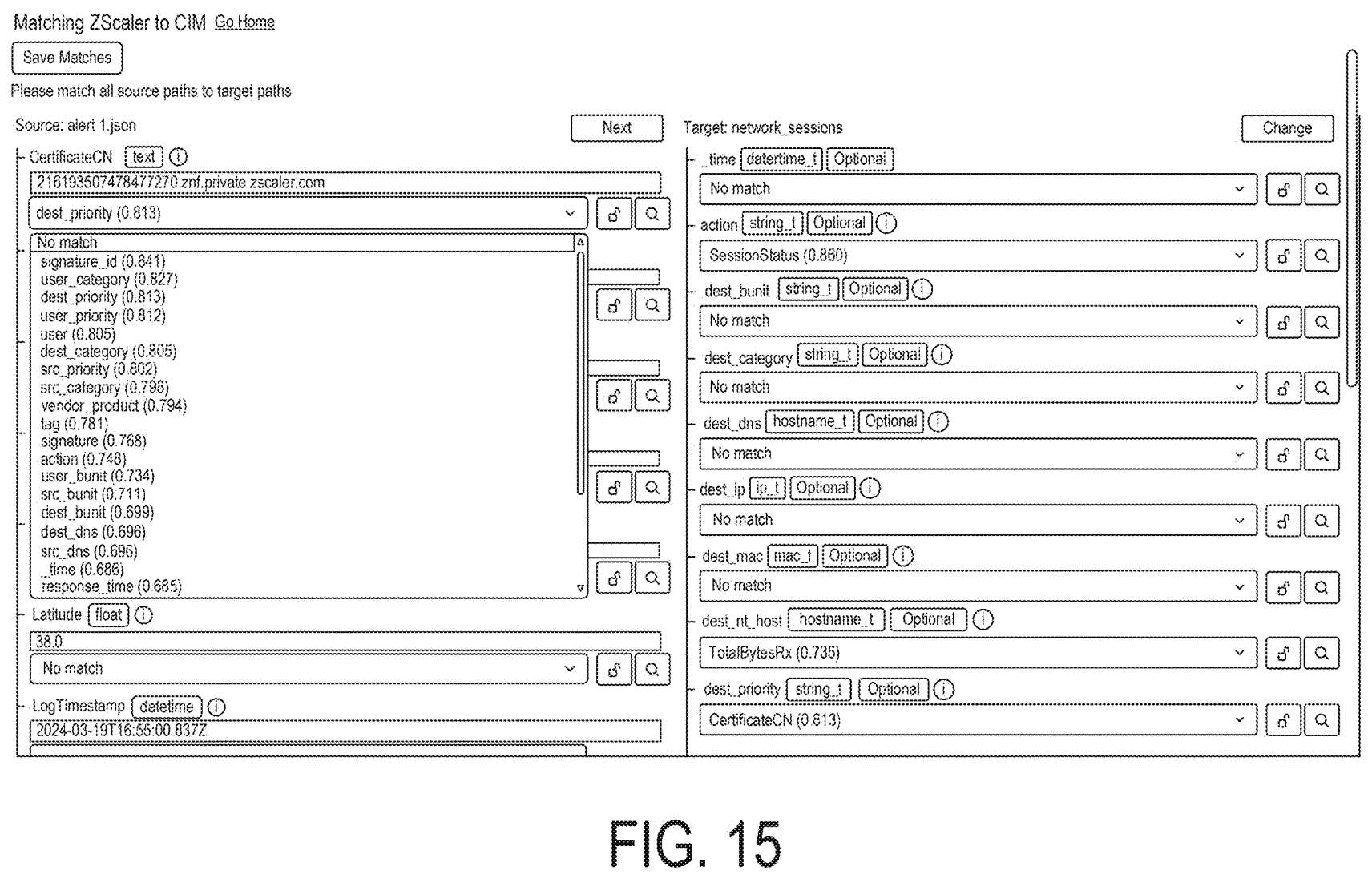

In FIG. 15, an iteration of field matching screen, shown at 408', shows fields are ranked by similarity.

As shown in FIG. 16, TA config editor screen 412 allows users to go from the field-to-field mapping created on the prior screen to a complete a UTS (e.g., Splunk) Technical Add-on which will ingest the source data and map it to the Splunk CIM. Most fields will be FIELDALIAS, which means the source field maps directly to a CIM field, and are generated automatically based on the field mapping, but there are other options users can select such as EXTRACT or EVAL, which allow more granularity in the mapping than direct field-to-field aliases.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of the present invention could be embodied in software, firmware or hardware, and when embodied in software, could be downloaded to reside on and be operated from different platforms used by real time network operating systems. Moreover, the particular naming of the components, capitalization of terms, the attributes, data structures, or any other programming or structural aspect is not mandatory or significant, and the mechanisms that implement the invention or its features may have different names, formats, or protocols.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. It should be further understood that any of the features described with respect to one of the embodiments described herein may be similarly applied to any of the other embodiments described herein without departing from the scope of the present invention. As used in this document, "each" refers to each member of a set or each member of a subset of a set.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Moreover, unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Embodiments of the present invention also relate to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible, non-transitory, computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), any other appropriate static, dynamic, or volatile memory or data storage devices, or other type of media suitable for storing electronic instructions, and each coupled to a computer system bus. Furthermore, the computers referred to in the specification may include a single processor or may be architectures employing multiple processor designs for increased computing capability.

In addition, the present invention is not described with reference to any particular programming language. It is appreciated that a variety of programming languages may be used to implement the teachings of the present invention as described herein, and any references to specific languages are provided for disclosure of enablement and best mode of the present invention.

Various systems may also be used with programs in accordance with the teachings herein, or it may prove convenient to construct more specialized apparatus to perform the required method steps. The required structure for a variety of these systems will be apparent to those of skill in the art, along with equivalent variations.

To aid the Patent Office and any readers of any patent issued on this application in interpreting the claims appended hereto, applicants wish to note that they do not intend any of the appended claims or claim elements to invoke 35 U.S.C. 112 (f) unless the words "means for" or "step for" are explicitly used in the particular claim.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims. It should be further understood that any of the features described with respect to one of the embodiments described herein may be similarly applied to any of the other embodiments described herein without departing from the scope of the present invention.

Having thus described the invention, what is claimed:

1. A cybersecurity event handling and enrichment system for processing security alerts from a plurality of disparate cyber security systems, the system comprising:

a Cybersecurity Event Handling Processor (CEHP) communicably couplable to one or more specialized cybersecurity tools running a connected security solution, a log/event forwarder, and/or an agent capable of gathering cybersecurity data;

the CEHP including:

a File System containing a Universal Target Schema (UTS) of target language representations in JavaScript Object Notation (JSON) (or Extensible Markup Language (XML)) format (UTS JSONs);

a Normalizer running Feature Extraction and Word Embeddings algorithms for tokenization and categorization;

a Tree Converter; and a Transformer running linguistic and structural matching algorithms;

the CEHP having a first memory, a first processor, and a first stored program in the first memory executable by the first processor, the first stored program configured to:

(a) cause the CEHP to capture events in one or more native formats generated by the one or more specialized cybersecurity tools, the events pertaining to potential cybersecurity threats;

(b) cause the Normalizer to run Feature Extraction and Word Embeddings algorithms for tokenization and categorization of the captured events to create normalized events;

(c) cause the Tree Converter to convert the normalized events into trees and then translate the trees into event representations in JSON (or XML) format (Event JSONs); and (d) cause the Transformer to run nearest neighbor and/or linguistic and structural matching algorithms to compare the Event JSONs to the UTS JSONs to generate output JSONs (Translation JSONs) from the UTS corresponding to the captured events.

2. The system of claim 1, wherein the first stored program is further configured to cause the Transformer to output quantitative similarity values from the nearest neighbor search incorporating linguistic and structural matching algorithm outputs to adjust the automated matching.

3. The system of claim 1, wherein the first stored program is further configured to:

(e) cause the CEHP to capture known events in one or more native formats generated by the one or more specialized cybersecurity tools, the known events pertaining to potential cybersecurity threats;

(f) cause the Normalizer to run Feature Extraction and Word Embeddings algorithms for tokenization and categorization of the captured known events to create normalized known events; and (g) cause the Tree Converter to convert the normalized known events into new trees, then translate the new trees into new UTS JSONs, and then add the new UTS JSONs to the UTS.

4. The system of claim 3, wherein the first stored program is further configured to cause the CEHP to use one or more threshold-based tests to signal a need to update the UTS.

5. The system of claim 4, wherein the first stored program is configured to cause the CEHP to execute an algorithm shown and described in the following pseudo code where

```
threshold_variable is configurable
target_schema = common ontology
incoming_schema = the document to be translated to the common ontology:
if (target_schema – threshold_variable) > 1 standard deviation from the incoming_schema
then
    identify new schema elements from incoming schema
    add those elements to the target schema
    regenerate the mathematical representation of the target schema
    run comparison of incoming_schema to newly updated target_schema
    repeat until there is a match less than 1 standard deviation
end.
```

6. The system of claim 5, wherein the first stored program is further configured to cause the CEHP to use one or more quantitative tests to signal a need to update the UTS.

7. The system of claim 6, wherein the first stored program is configured to cause the CEHP to execute an algorithm shown and described in the following pseudo code:

```
If incoming_shema.element is not equal to target_schema.element
If not, set target_schema.element = incoming_schema.element.
```

8. The system of claim 6, wherein the first stored program is configured to cause the CEHP to execute an algorithm shown and described in the following pseudo code:

```
If incoming_shema.element is not equal to target_schema.element
If not, if length of incoming_shema.element > length of target_schema.element
Then
    Set target_schema.element = incoming_shema.element
Else
    Leave it, the target schema is already more detailed.
```

9. The system of claim 3, wherein the first stored program is further configured to cause the CEHP to maintain backward compatibility of the UTS by one or more of embedding fields within the target language elements to label the version of the index, and/or maintaining previous versions of elements along with new versions, within the UTS.

10. The system of claim 3, wherein the first stored program is further configured to cause the CEHP to map the Event JSONs, the UTS JSONs, and/or the output JSONs corresponding to captured events to identify source and type of events.

11. The system of claim 3, wherein the first stored program is further configured to cause the CEHP to map the Event JSONs, the UTS JSONs, and/or the output JSONs corresponding to captured events to generate event configuration information useful for Security Information and Event Management System (SIEM) reporting and analytics.

12. A method for processing security alerts from a plurality of disparate cyber security systems, the method comprising:

(a) configuring a Cybersecurity Event Handling Processor (CEHP) for being communicably coupled to one or more specialized cybersecurity tools running a connected security solution, a log/event forwarder, and/or an agent capable of gathering cybersecurity data;

(b) configuring the CEHP to include:
a File System containing a Universal Target Schema (UTS) of target language representations in JavaScript Object Notation (JSON) (or Extensible Markup Language (XML)) format (UTS JSONs);
a Normalizer running Feature Extraction and Word Embeddings algorithms for tokenization and categorization;
a Tree Converter; and
a Transformer running linguistic and structural matching algorithms;

(c) capturing, with the CEHP, events in one or more native formats generated by the one or more specialized cybersecurity tools, the events pertaining to potential cybersecurity threats;

(d) with the Normalizer, running Feature Extraction and Word Embeddings algorithms for tokenization and categorization of the captured events to create normalized events;

(e) converting, with the Tree Converter, the normalized events into trees and then translating the trees into event representations in JSON (or XML) format (Event JSONs); and (f) with the Transformer, running nearest neighbor and/or linguistic and structural matching algorithms to compare the Event JSONs to the UTS JSONs to generate output JSONs (Translation JSONs) from the UTS corresponding to the captured events.

13. The method of claim 12, further comprising outputting, with the Transformer, quantitative similarity values from the nearest neighbor search incorporating linguistic and structural matching algorithm outputs to adjust the automated matching.

14. The method of claim 12, further comprising:

(g) capturing, with the CEHP, known events in one or more native formats generated by the one or more specialized cybersecurity tools, the known events pertaining to potential cybersecurity threats;

(h) with the Normalizer, running Feature Extraction and Word Embeddings algorithms for tokenization and categorization of the captured known events to create normalized known events; and (i) converting, with the Tree Converter, the normalized known events into new trees, then translating the new trees into new UTS JSONs, and then adding the new UTS JSONs to the UTS.

15. The method of claim 14, further comprising using, with the CEHP, one or more threshold-based tests to signal a need to update the UTS.

16. The method of claim 15, further comprising executing, with the CEHP, an algorithm shown and described in the following pseudo code where

```
threshold_variable is configurable
target_schema = common ontology
incoming_schema = the document to be translated to the common
ontology:
if (target_schema – threshold_variable) > 1 standard deviation from the
incoming_schema
then
    identify new schema elements from incoming schema
    add those elements to the target schema
    regenerate the mathematical representation of the target schema
    run comparison of incoming_schema to newly updated target_schema
    repeat until there is a match less than 1 standard deviation
end.
```

17. The method of claim 16, further comprising using one or more quantitative tests to signal a need to update the UTS.

18. The method of claim 17, further comprising executing, with the CEHP, an algorithm shown and described in the following pseudo code:

```
If incoming_shema.element is not equal to target_schema.element
If not, set target_schema.element = incoming_schema.element.
```

19. The method of claim 17, further comprising executing, with the CEHP, an algorithm shown and described in the following pseudo code:

```
If incoming_shema.element is not equal to target_schema.element
If not, if length of incoming_shema.element > length of target_schema.
element
Then
    Set target_schema.element = incoming_shema.element
Else
    Leave it, the target schema is already more detailed.
```

20. The method of claim 14, further comprising maintaining backward compatibility of the UTS by one or more of embedding fields within the target language elements to label the version of the index, and/or maintaining previous versions of elements along with new versions, within the UTS.

21. The method of claim 14, further comprising mapping the Event JSONs, the UTS JSONs, and/or the output JSONs corresponding to captured events to identify source and type of events.

22. The method of claim 14, further comprising mapping the Event JSONs, the UTS JSONs, and/or the output JSONs corresponding to captured events to generate event configuration information useful for Security Information and Event Management System (SIEM) reporting and analytics.

* * * * *